July 26, 1927.
J. F. O'CONNOR
1,637,087
FRICTION SHOCK ABSORBING MECHANISM
Filed Aug. 23, 1923
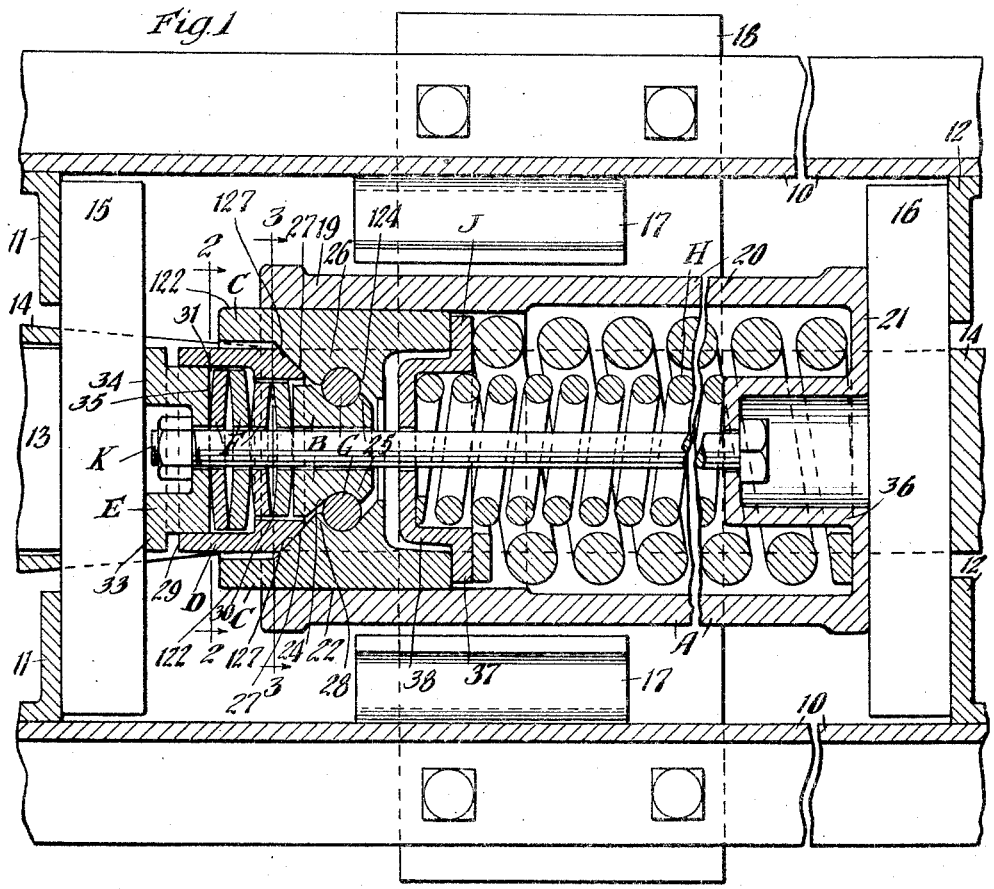
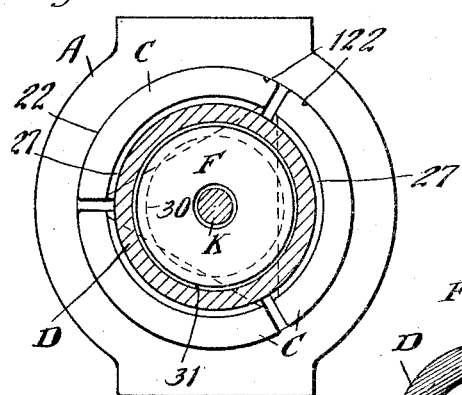
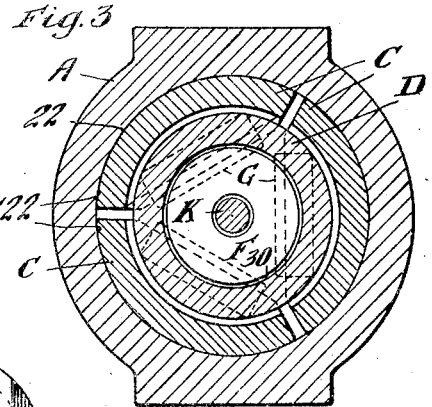
Witnesses
Wm. Geiger
Inventor
John F. O'Connor
By George J. Haight
His Atty.

Patented July 26, 1927.

1,637,087

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 23, 1923. Serial No. 658,874.

This invention relates to improvements in friction shock absorbing mechanisms.

One object of the invention is to provide a friction shock absorbing mechanism adapted to cushion extremely heavy shocks and more particularly such a mechanism which is especially adapted for railway draft riggings.

Another object of the invention is to provide a mechanism of the character indicated, including a pressure transmitting wedge and a plurality of wedge friction shoes cooperating therewith wherein means is provided for preventing an excessive spreading action of the wedge system which would be injurious to the shell.

Still another object of the invention is to provide a mechanism of the character indicated comprising a wedge system including blunt and keen angled wedge elements, wherein means, adapted to yield when the co-efficient of the friction exceeds a predetermined limit, is interposed between the keen wedge acting elements and the pressure transmitting means to limit the keen wedging action.

Other objects and advantages of the invention will more clearly appear from the description and claims hereinafter following.

In the drawing forming a part of this specification, Figure 1 is a longitudinal, sectional view of a portion of a railway draft rigging showing my improvements embodied therein, the section through the shell and friction elements therewithin corresponding to two section planes at approximately 120° apart. Figures 2 and 3 are vertical, transverse, sectional views corresponding substantially to the section lines 2—2 and 3—3, respectively, of Figure 1. And Figure 4 is a detailed, end elevational view of a wedge ring employed in connection with my improvements.

In said drawing, 10—10 indicate the usual draft or center sills of a car underframe, said sills being preferably of channel cross-section, and to the inner faces of which are secured front stop lugs 11 and rear stop lugs 12 of usual construction. A portion of the drawbar is indicated at 13, the same having operatively associated therewith a hooded cast yoke 14 of well-known form, and within which is disposed the shock absorbing mechanism proper, hereinafter described, a front main follower 15, and a rear main follower 16. The friction shock absorbing mechanism proper, illustrated in the drawing, is of that form employing a substantially cylindrical, combined friction shell and spring cage, and to maintain the same in proper central position, the draft sills 10 may have secured to the inner faces thereof guide plates 17—17. The yoke and parts contained therein are supported in operative position by a detachable saddle plate 18.

The improved shock absorbing mechanism proper, as shown, comprises, broadly, a combined friction shell and spring cage casting A; a pressure transmitting wedge B; three friction shoes C—C—C; a wedge ring D; a front follower block or plate E; a series of spring plates F; anti-friction rollers G—G; a main spring resistance H; a spring follower cap J; and a retainer bolt K.

The casting A is of generally cylindrical form having the friction shell proper 19 thereof formed at the open or front end. Rearwardly of the friction shell proper, the casting provides a central spring cage or casing 20 and at its rear end, the casing A has an integral transverse wall 21 bearing on the follower 16. On the interior of the shell 19 is provided a cylindrical friction surface 22 on which the shoes are adapted to slide.

The wedge B through which the pressure is transmitted, is in the form of a solid cylindrical block having a front transverse bearing surface abutting the innermost plate of the series F. At the inner end, said wedge B is provided with three, rearwardly converging, flat wedge faces 24 symmetrically disposed around the center or axis of the wedge. At the inner end of each wedge face 24 a shoulder 25 is provided, thereby forming a seat for the corresponding roller G.

The three friction shoes C are all of like construction, each having an outer friction face 122, which corresponds to a portion of a true cylindrical surface, extending through an arc of approximately 120°. The shoes C are interposed between the wedge B and the shell, with the surfaces 122 of the three shoes cooperating with the friction surface 22. On the inner side, that is the side nearest the axis of the shell, each shoe is provided with a lateral enlargement 26 having a pair of rearwardly and inwardly inclined flat faces 27 and 124 cooperating respectively with the wedge ring D and the wedge B. Adjacent the front end portion of each face 124 a shoulder 28 is provided adapted to form a seat for the roller G interposed between the face 124 and the corresponding face 24 of the wedge B. The wedge faces 27 and 124 of the shoes C are preferably inclined at the same angle to the longitudinal axis of the mechanism, while the faces 24 of the wedge are disposed at a relatively keener angle to said axis. Although the inclination of the various wedge faces may be varied within certain limits and still accomplish the desired result, the faces 27 and 124 are preferably disposed at an angle of 50° and the faces 24 are preferably disposed at an angle of 40° to the axis of the mechanism.

The follower block E is in the form of hollow cylindrical casting having a heavy angular flange 33 at the front end thereof, for a purpose hereinafter described. The block E is provided with a flat front face 34 adapted to bear on the front follower 15, and a flat rear face 35 adapted to abut the outermost spring plate of the series F.

The wedge D is in the form of a hollow cylinder or ring having a flat front end face 29 and three inwardly and rearwardly converging flat faces 127 adapted to cooperate respectively with the wedge faces 27 of the three friction shoes C and correspondingly inclined thereto. The inner end of the ring D surrounds the outer end portion of the wedge B and the opening 30 of the former is adapted to slidingly accommodate said outer end portion. The opening 30 through the ring D is preferably enlarged at the front end thereof, as indicated at 31, to slidingly accommodate the cylindrical portion of the follower block E.

The spring plates F are four in number and of similar design, each being in the form of a dished disc. The series of plates F are arranged in pairs with the concave faces of the plates composing each pair disposed in opposed relation. As clearly shown in Figure 1, the plates of the outer pair are of greater diameter than the plates of the inner pair and are disposed within the enlarged portion 31 of the opening 30 of the ring, while the plates of the inner pair are disposed within the smaller portion of said opening 30.

The spring resistance H, as shown, comprises an outer relatively heavy coil bearing at its inner end against the wall 21 of the casing A, and an inner relatively lighter coil bearing at its inner end upon a hollow cup-like boss 36 formed integral with the end wall 21.

The spring follower cap J is of generally cup-shape form, having an annular flange 37 on the inner side of which is adapted to bear the front end of the outer coil of the spring. The spring follower or cap J has a forwardly extended, integral cup-shaped section 38, the interior of which provides a bearing for the front end of the inner coil spring H.

The retainer bolt K is anchored at its rear end within the boss 36 and at its front end within a suitable recess provided within the block E, the latter, the spring plates F, the wedge B, and the spring follower J being suitably apertured to accommodate the shank of the bolt. The retainer bolt J not only serves to maintain the parts in assembled relation but holds the parts under initial compression and may be utilized to adjust the parts to the proper length and maintain them in this position when under full release, even after parts are worn.

The normal position of the parts is as illustrated in Figure 1, the front end of the ring D being shown as spaced a predetermined distance from the inner face of the flange 33 of the block E. In actual practice the spacing is preferably approximately one-quarter of an inch, although any other predetermined amount less than resilient action of plates F may be employed.

Assuming a buffing or compressing action applied to the draft rigging, the operation is as follows. As the front follower 15 moves toward the shell A, the wedge B is forced inwardly of the shell therewith, effecting initially a slight movement of the wedge B with respect to the shoes C and setting up the desired spreading action. During this time the series of spring discs F act as a substantially solid pressure transmitting member, forcing the wedge B inwardly in unison with the follower 15. As the inward movement of the parts continues, the shoes are forced inwardly of the shell on the surface 22 thereof by the wedge B, but when undue resistance is offered to the movement of the shoes, the resistance afforded by the high capacity yielding element F is overcome and the same is compressed until the flange 33 of the block E directly engages with the wedge ring D, whereupon, the shoes are moved inwardly of the shell by additional pressure of the wedge ring D, there being no further relative movement between the wedge B and the shoes, or between the wedge B and the wedge ring D during the remainder of the compression stroke.

Upon removal of the actuating or compressing force, assuming that the wedging has been effected during the compression stroke by the wedge B only, instant release will be effected due to the anti-friction action of the rollers between the shoes and the wedge B and all the parts will be restored to normal position by the springs. Release will also be effected instantaneously when the shoes have been partially forced inwardly during the compression stroke by the wedge ring D, due to the bluntness of the coacting wedge faces of the shoes and ring, and absence of any retarding force on the ring, the release of the wedge D being also instantly effected due to the anti-friction action of the rollers previously described. It will be evident that the block E will be forced outwardly to normal position by the expansion of the yielding element F.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell having interior friction surfaces; of a series of friction shoes within and cooperable with said shell, said shoes each having a pair of wedge faces disposed angularly to the longitudinal axis of the mechanism; a spring resistance; spreader means co-operable with said shoes, said spreader means including a pair of elements, one of said elements having wedge faces co-operating with one of the wedge faces of each of said shoes, and correspondingly inclined thereto and the other element having wedge faces disposed at a keener angle than the wedge faces of said first named element co-operating with the remaining wedge faces of each of said shoes, all of the wedge faces of each element being fixed with reference to each other; anti-friction rollers interposed between the keen wedge faces of said spreader means and the co-operating shoe faces; and means for positively limiting the action of the keener wedge faces when a predetermined frictional resistance is encountered.

2. In a friction shock absorbing mechanism, the combination with a friction shell having an interior friction surface; of a plurality of friction shoes within the shell, said shoes each having a pair of wedge faces disposed at a relatively blunt angle to the longitudinal axis of the mechanism; a spring resistance; a wedging system co-operable with said shoes, said system comprising a plurality of elements having faces correspondingly inclined to the shoe faces and engaging certain of said shoe faces, and other faces disposed at relatively keener angles than said shoe faces; anti-friction rollers interposed between said keen faces and the co-operating faces of the shoes; and means becoming operative when a predetermined frictional resistance is encountered to effect movement of said shoes inwardly directly by the action of said co-operating blunt wedge faces.

3. In a friction shock absorbing mechanism, the combination with a friction shell; of a plurality of friction shoes coacting with said shell, each of said shoes having a pair of wedge faces; a spring resistance coacting with said shoes; a main wedge coacting with said shoes; anti-friction rollers interposed between said main wedge and one set of faces of said shoes; yielding pressure transmitting means coacting with said wedge; an auxiliary wedge coacting with the remaining faces of said shoes; and means for actuating said auxiliary wedge after a predetermined compression of said yielding means.

4. In a friction shock absorbing mechanism, the combination with a friction shell; of a plurality of friction shoes coacting with said shell, each of said shoes having a pair of wedge faces; a spring resistance coacting with said shoes; a main wedge also coacting with said shoes, said main wedge having wedge faces extending at a relatively keen angle to the axis of the mechanism; an anti-friction roller interposed between each of the faces of said wedge and one of the faces of each of said shoes; yielding pressure transmitting means coacting with said wedge; an auxiliary wedge coacting with the remaining faces of said shoes; and means for actuating said auxiliary wedge after a predetermined compression of said yielding means.

5. In a friction shock absorbing mechanism, the combination with a main follower; of a friction shell; a plurality of friction shoes coacting with said shell, each of said shoes having a pair of wedge faces, one of which is relatively blunt; a spring resistance coacting with said shoes; main and auxiliary wedges coacting with said shoes, said auxiliary wedge having blunt wedge faces coacting with the blunt wedge faces of the shoes; and pressure transmitting means interposed between said follower and wedges, including a yielding element coacting with said main wedge.

6. In a friction shock absorbing mechanism, the combination with a main follower; of a friction shell; a plurality of friction shoes coacting with said shell; a spring resistance coacting with said shoes; a main and auxiliary wedges coacting with said shoes; a pressure transmitting member cooperating with said follower; a yielding element interposed between said member and main wedge for normally forcing said wedge inwardly of the shell in unison with said follower and adapted to yield when a predetermined resistance is encountered by said shoes; and means on said member normally spaced from said auxiliary wedge for directly actuating the latter when said yielding element is compressed.

7. In a friction shock absorbing mechanism, the combination with a front follower; of a friction shell having an interior friction surface; a plurality of friction shoes coacting with said shell friction surface, each shoe having a pair of wedge faces, one of which extends at a blunt angle with reference to the axis of the mechanism; a wedge ring having blunt wedge faces adapted to coact with the blunt faces of the shoes; a main wedge having relatively keen wedge faces; anti-friction rollers interposed between the faces of said main wedge and the remaining faces of said shoes; pressure transmitting means coacting with said front follower; high capacity yielding means interposed between said pressure transmitting means and main wedge, said yielding means being adapted to yield when a predetermined resistance is encountered by said shoes; and a shoulder on said pressure transmitting means, normally spaced from the outer end of said ring, adapted to engage and directly force the ring inwardly of the shell when said yielding means is compressed.

In witness that I claim the foregoing I have hereunto subscribed my name this 21st day of August, 1923.

JOHN F. O'CONNOR.